(12) United States Patent
Goder et al.

(10) Patent No.: US 6,922,041 B2
(45) Date of Patent: Jul. 26, 2005

(54) APPARATUS FOR AND METHOD OF ADJUSTING A SWITCHING REGULATOR OUTPUT FOR A CIRCUIT HAVING A PRE-CHARGE VOLTAGE

(75) Inventors: Dimitry Goder, San Jose, CA (US); Christopher J. Sanzo, Providence, RI (US)

(73) Assignee: Sipex Corporation, Milpitas, CA (US)

( * ) Notice: Subject to any disclaimer, the term of this patent is extended or adjusted under 35 U.S.C. 154(b) by 92 days.

(21) Appl. No.: 10/377,182

(22) Filed: Feb. 28, 2003

(65) Prior Publication Data

US 2004/0169498 A1 Sep. 2, 2004

(51) Int. Cl.[7] ................................. G05F 1/40
(52) U.S. Cl. .................... 323/275; 323/284; 323/285
(58) Field of Search ........................ 323/274, 275, 323/284, 285

(56) References Cited

U.S. PATENT DOCUMENTS

| | | | | |
|---|---|---|---|---|
| 5,375,029 A | * | 12/1994 | Fukunaga et al. | 361/101 |
| 6,225,795 B1 | * | 5/2001 | Stratakos et al. | 323/283 |
| 6,348,780 B1 | * | 2/2002 | Grant | 323/222 |
| 6,369,556 B1 | * | 4/2002 | Ohshima | 323/282 |
| 6,396,250 B1 | * | 5/2002 | Bridge | 323/283 |
| 6,426,612 B1 | * | 7/2002 | Rozsypal | 323/282 |
| 6,674,272 B2 | * | 1/2004 | Hwang | 323/284 |

OTHER PUBLICATIONS

Texas Instruments, "Low–Input Voltage–Mode Synchronous Buck Controller", pp. 1–19, (Jan. 2002) Revised Jun. 2002.

* cited by examiner

Primary Examiner—Bao Q. Vu
(74) Attorney, Agent, or Firm—Fliesler Meyer LLP

(57) ABSTRACT

A switching regulator target voltage is adjusted to a first value corresponding to a pre-charge voltage that is present at a regulator output terminal. The switching regulator responds to a comparison signal resulting from a comparison of the target voltage and a feedback voltage. When the switching regulator is on, the target voltage is adjusted to a second value corresponding to a nominal regulator output voltage. In one embodiment, a synchronous switch is disabled when a lockout circuit receives a disable signal. The lockout circuit is unlocked when an enable signal is provided by a switching controller.

28 Claims, 6 Drawing Sheets

APPARATUS FOR AND METHOD OF ADJUSTING A SWITCHING REGULATOR OUTPUT FOR A CIRCUIT HAVING A PRE-CHARGE VOLTAGE

FIELD OF THE INVENTION

The invention relates to the field of switching regulators, and in particular, to adjusting a switching regulator output when the regulator is turned on.

BACKGROUND OF THE INVENTION

Generally, switching regulators are employed as DC power sources. In some applications, when the regulator is first turned on, a pre-existing voltage exists at the switching regulator output terminal, e.g., a pre-charge voltage. This pre-charge voltage may either result from an external voltage source, or a residual charge that exists across the load, for example, a residual voltage across output filter capacitors of the switching regulator. Many switching regulators employ output switches that alternately connect a switched node to an input voltage and ground when the switching regulator is on. Often, these output switches are solid state devices (e.g., MOSFETs) that allow current to flow through the switch in either direction from a switch drain terminal to a switch source terminal. Thus, under some operating conditions, operation of the output switches may allow a reverse current to flow from the regulator output terminal to ground through a regulator output filter inductor, e.g. the switch acts as a current sink. This condition is especially problematic for switching regulators that employ a soft start, i.e, gradually increase a target regulator output voltage at startup. When switching regulators that employ a soft start are first turned on (i.e., the switching controller first begins to supply a switching controller output to turn on one of the output switches), they detect that the output voltage at the regulator output terminal is greater than the target regulator output voltage and allow a reverse current that may drain all or part of the pre-charge voltage present at the regulator output terminal.

FIG. 1 is a prior art circuit employing a zero-crossing detector to prevent the pre-charge voltage from being drained when the switching regulator is turned on. The switching regulator 9 includes a switching controller 10, a first switch 11, a second switch 12, an output filter 14, and a zero-crossing detector 16. The first and second switches 11, 12 operate in response to a logic signal appearing at a switching controller output 22. First switch 11 connects a switched node 30 to an input voltage terminal 24 when it is on. When the second switch 12 is on, it connects the switched node 30 to ground. A first terminal 28 of the zero-crossing detector is connected to the switched node 30. The switched node 30 is also connected to an output filter inductor 34 terminal 36. A second terminal 33 of zero-crossing detector 16 is connected to ground. The output terminal 30 of the zero-crossing detector 16 is connected to a first input 38 of an AND gate 40 that supplies a logic signal to a gate of the second switch 12. A second input 42 of AND gate 40 is the inverted output signal of switching controller 10. The circuit is configured such that the first switch 11 conducts when the output of switching controller 10 is a high logic state. Provided that a reverse current flow is not detected, the second switch 12 conducts when the output of the switching controller is a low logic state.

The zero-crossing detector produces a low logic state at the zero-crossing detector output terminal 36 to indicate a reverse current flow when the voltage on switched node 30 is positive with respect to ground. The low logic state is supplied to first input 38 of AND gate 40. In this condition, a low logic signal is maintained at the AND gate output terminal 44, regardless of the logic value present at the second AND gate input 42. As a result, second switch 12 is prevented from being turned on. Although this approach detects the reverse current flow through switch 12, it requires a fast zero-crossing detector to prevent the pre-charge voltage from being drained.

Further, the zero-crossing detector of FIG. 1 operates in an environment where the signal to noise ratio is very low. In this environment, the signal that is being measured across second switch 12 (i.e., between a first inductor terminal 46 and a ground) may be as low as 5 mV. However, the noise signal at switched node 30 may be as high as several volts. Consequently, it is difficult to accurately detect reverse current. Additionally, the circuit of FIG. 1 may complicate an integrated circuit comprising switching regulator 9 because the circuit requires an additional pin to provide access to switched node 30.

The present invention addresses these shortcomings.

SUMMARY OF THE INVENTION

Preventing a pre-charge voltage at a switching regulator output terminal from being drained when a switching regulator is turned on, is most effectively accomplished when the regulator switched node is not connected to ground until the target voltage is greater than the pre-charge voltage. It is also advantageous to combine a soft start adjustment of a switching regulator target voltage with a circuit that prevents a pre-charge voltage from being drained.

In one aspect, the invention provides a method of controlling a switching regulator by setting the target voltage to a first value corresponding to a voltage present at a regulator output terminal when the switching regulator is off. Further, when the switching regulator is on, the target voltage is adjusted to a second value. In one embodiment, a comparison signal is generated as a result of a comparison between the target voltage and a feedback voltage. This embodiment may also include a comparison between the first reference voltage and a second reference voltage to generate the target voltage. In another embodiment, the first value of the target voltage is generated in response to an energy storage device being placed in electrical communication with the regulator output terminal. In a version of this embodiment, the second value is generated in response to the energy storage device being disconnected from the regulator output terminal.

In another aspect of the invention, a circuit for controlling a switching regulator includes an error amplifier with a first input terminal, a second input terminal and an error amplifier output terminal. In this aspect, the switching regulator includes a switching controller and a regulator output terminal. The error amplifier output terminal is in electrical communication with a switching controller. Additionally, a reference terminal is in electrical communication with both the first input terminal of the error amplifier and the reference voltage. Further, a feedback terminal is in electrical communication with both the second input terminal of the error amplifier and the regulator output terminal. In this aspect, the circuit also includes an energy storage device having a first storage device terminal that is in electrical communication with both the first input terminal of the error amplifier and the reference terminal. The energy storage device provides the target voltage to the first input terminal of the error amplifier. The target voltage has a first value that corresponds to a voltage that is present at the regulator output terminal when the switching regulator is off. The target voltage has a second value corresponding to the reference voltage when the switching regulator is on.

In yet another aspect of the invention, a circuit for controlling a switching regulator includes an error amplifier comprising a first amplifier input terminal, a second amplifier terminal and an amplifier output terminal. In this aspect, the switching regulator includes a switching controller and a regulator output terminal. The error amplifier output terminal is in electrical communication with the switching controller. This aspect also includes a selector circuit that has a first selector input terminal, a second selector input terminal, and a selector output terminal that is in electrical communication with the first amplifier input terminal. Further, the reference terminal is in electrical communication with the first selector input terminal, and a feedback terminal is in electrical communication with both the second amplifier input terminal and the regulator output terminal. Additionally, in this aspect, an energy storage device is included in the circuit. The energy storage device has a first storage device terminal that is in electrical communication with the second selector input terminal. The energy storage device maintains the first voltage corresponding to a voltage that is present at the regulator output terminal when the regulator is off. The selector circuit provides the target voltage which corresponds to one of the first voltage and the reference voltage present at the reference terminal to the first amplifier input terminal.

In still another aspect, the invention provides a method of controlling a switching regulator. In this aspect, when the switching regulator is off, a first setpoint value corresponding to a voltage at a regulator output terminal is established. When the switching regulator is on, the first setpoint value is adjusted in response to an elapsed time. In one embodiment, a second setpoint value corresponding to a regulator output voltage is set, and the target voltage is selected from a value that corresponds to one of the first setpoint value and the second setpoint value. In another version, the first setpoint value is established in response to a start signal. Further, the elapsed time may be adjusted in response to the start signal and a clock signal.

In a further aspect, a circuit is provided for controlling a switching regulator. The switching regulator includes a regulator output terminal, and a switching controller that includes a first controller input terminal and a second controller input terminal. The circuit includes an analog-to-digital converter comprising an input terminal and an output terminal with the output terminal in electrical communication with the second controller input terminal. A feedback terminal is in electrical communication with both the input terminal of the analog digital converter and the regulator output terminal. This aspect also includes a counter that has a first counter input terminal in electrical communication with the output terminal of the analog digital converter, and a counter output terminal. Additionally, this aspect includes a storage device that has a storage device output terminal. The storage devices stores a second set point that corresponds to a nominal regulator output voltage. Further, this aspect includes a selector that has a first selector input terminal in electrical communication with a storage device output terminal, a second selector input terminal in electrical communication with a counter output terminal, and a selector output terminal in electrical communication with the first controller input terminal. In this aspect, the counter generates a first set point in response to both the voltage present at the regulator output terminal and an elapsed time. The selector generates a target value in response to the first set point and the second set point.

In yet a further aspect, the invention provides a circuit for controlling a switching regulator. The switching regulator includes output switches comprising a first switch and a second switch, a switched node, a regulator output terminal, and a switching controller. The switching controller includes a controller output terminal that is in electrical communication with the first switch. In this aspect, the circuit includes a lockout circuit that has a first lockout circuit input terminal in electrical communication with the controller output terminal, and a lockout circuit output terminal in electrical communication with the second switch. The lockout circuit prevents the second switch from connecting the switched node to ground until the switching controller generates an enable signal at the controller output terminal. The switching regulator adjusts the output voltage in response to the enable signal. In one embodiment, the second switch is a synchronous rectifier. In a version of this embodiment, the switching controller is a pulse width modulator.

In still a further aspect, the invention provides a method of controlling a switching regulator, where the switching regulator includes a synchronous rectifier, a switched node and a switching controller comprising a controller output terminal. A synchronous rectifier is prevented from turning on when it is disabled in response to a disable signal. The synchronous rectifier is enabled in response to an enable signal that is generated by the switching controller at the controller output terminal. Once enabled, the synchronous rectifier is allowed to turn on. The switching regulator adjusts the regulator output voltage in response to the enable signal. In one embodiment, the target voltage is supplied to an error amplifier input.

BRIEF DESCRIPTION OF THE DRAWINGS

FIG. 1 is a prior art embodiment of a circuit used to prevent the discharge of a pre-existing voltage present at a regulator output terminal when the regulator is turned on.

DETAILED DESCRIPTION

Figure 1:
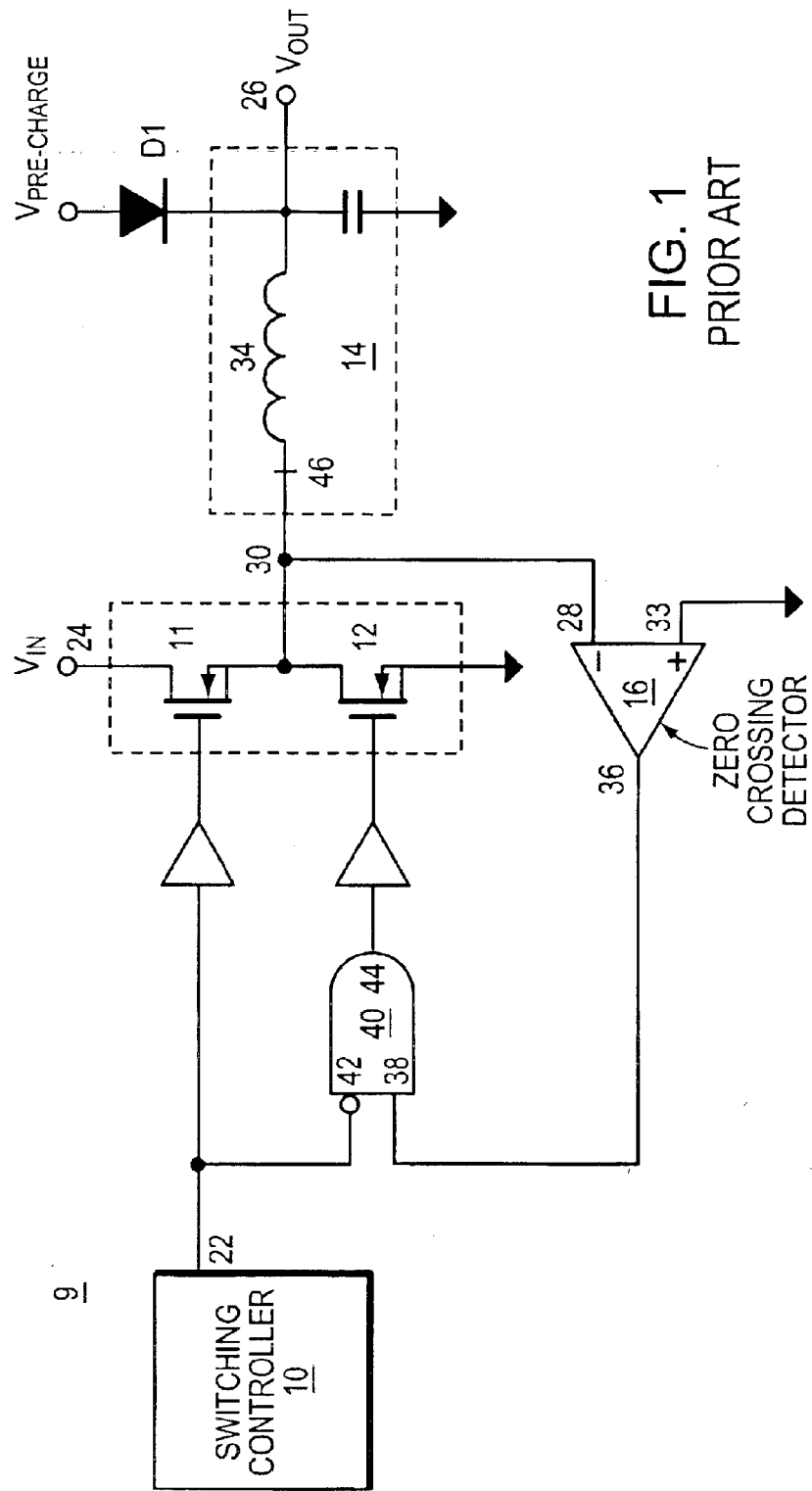
Figure 2:
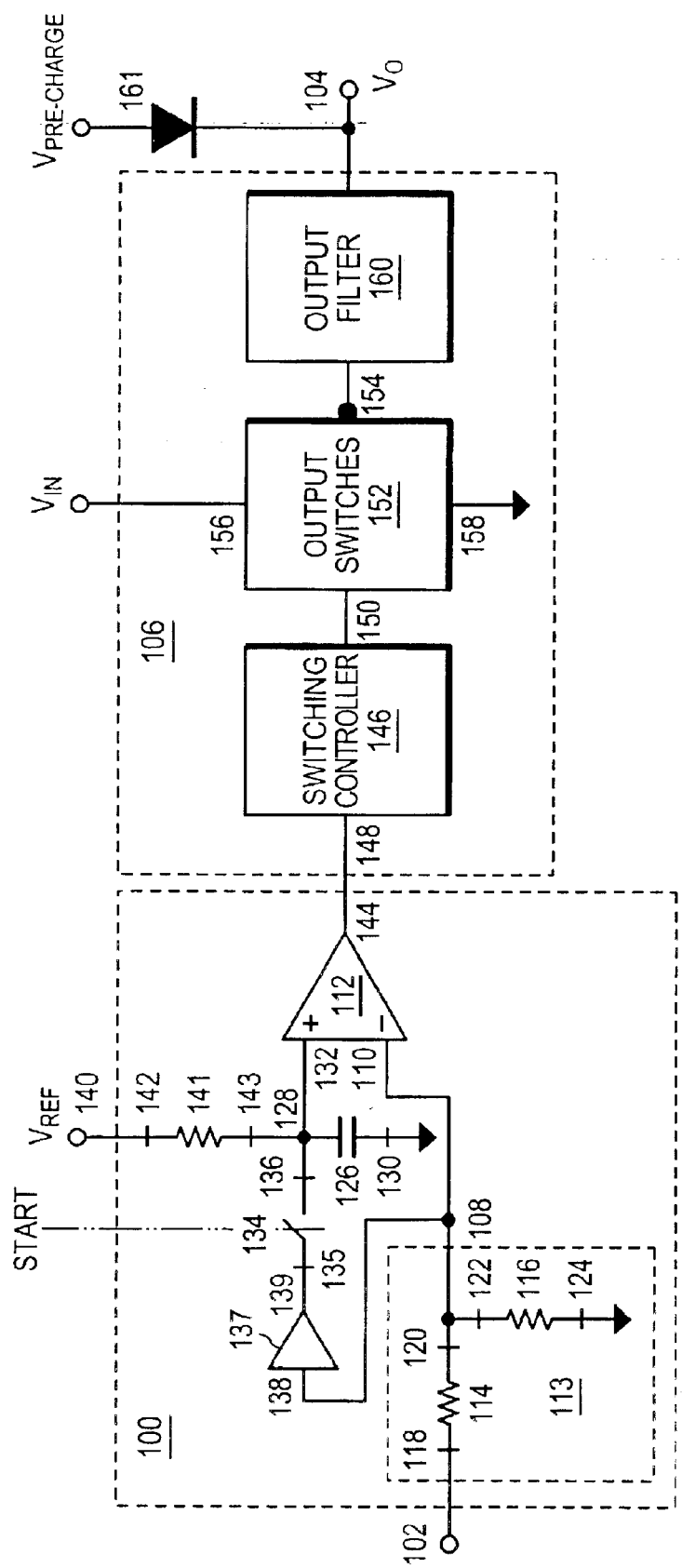
FIG. 2 is a schematic diagram of an embodiment of a circuit in accordance with the invention.

Referring now to FIG. 2, one embodiment of a control circuit 100 that is employed with a switching regulator 106 is shown. Control circuit 100 is, in part, used to prevent the discharge of a pre-existing voltage present at a regulator output terminal 104. The control circuit 100 input is connected to the regulator output terminal 104 at a feedback terminal 102 through a means not shown here. Control circuit 100 includes an error amplifier 112 that has an output terminal 144 that is also the output of control circuit 100. Error amplifier output terminal 144 is connected to the input of switching regulator 106. The comparison signal provided by error amplifier 112 at error amplifier output terminal 144 is employed by the switching regulator 106 to control the regulator output voltage. In one embodiment, the comparison is performed by a comparator that provides a logic signal at its output terminal. In one embodiment, switching regulator 106 includes a switching controller 146, output switches 152, and an output filter 160.

Generally, the comparison signal results from a comparison, by error amplifier 112, of a target voltage and a feedback voltage. Switching controller 146 generates a logic signal at the switching controller output terminal 150 in response to the comparison signal. The logic signal drives output switches 152. Depending upon the logic state of the logic signal, a switched node 154 is connected to either an input voltage $V_{IN}$ or ground. Thus the operation of the output switches adjusts the regulator output voltage that appears at regulator output terminal 104.

Now in more detail, control circuit 100 includes a feedback input node 108 that is connected to both feedback terminal 102 and a second input terminal 110 of an error amplifier 112. Control circuit 100 may include one or more devices connected between feedback terminal 102 and the feedback input node 108. For example, in one embodiment, a resistance network 113 is connected between feedback terminal 102 and the feedback input node 108 to shift the voltage at feedback input node 108. In a version of this embodiment, the resistance network is a resistor divider network which includes a first resistor 114 and a second resistor 116. The first resistor 114 has a first terminal 118 connected to feedback terminal 102 and a second terminal 120 connected to feedback input node 108. Second resistor 116 has a first terminal 122 connected to feedback input node 108 and a second terminal 124 connected to ground. In another embodiment, feedback terminal 102 and feedback input node 108 are the same.

Control circuit 100 also includes an energy storage device 126 having a first storage device terminal 128 and a second storage device terminal 130. In one embodiment, energy storage device 126 is a capacitor. In the embodiment shown, first storage device terminal 128 is connected to a first input terminal 132 of error amplifier 112, and second storage device terminal 130 is connected to ground. In one embodiment, first storage device terminal 128 is also connected to feedback input node 108 by way of isolation switch 134. Isolation switch 134 allows first storage device terminal 128 to be disconnected from feedback input terminal 108. In one embodiment, the circuit also includes a buffer 137 with a first buffer terminal 138 connected to feedback input node 108 and a second buffer terminal 139 connected to the first storage device terminal 128 through switch 134. Regardless of the state of isolation switch 134, a first terminal 135 of isolation switch 134 is connected to feedback input node 108 through buffer 137, and a second terminal 136 of isolation switch 134 is connected to first storage device terminal 128. The isolation switch 134 is any isolating device including solid-state switches such as MOSFETS and the like, provided the isolation device is capable of changing state in response to a Start signal. Further, where buffer 137 is a tri-state device, buffer 137 may be employed as an isolation switch removing the need for separate switch 134.

Control circuit 100 also includes a reference terminal 140 that supplies a reference voltage $V_{REF}$ to control circuit 100. Although reference terminal 140 is shown as a connection to an external voltage source, control circuit 100 may include an integral voltage source that provides reference voltage $V_{REF}$. In one embodiment, first storage device terminal 128 is directly connected to second isolation switch terminal 136, and first input terminal 132 of error amplifier 112. In one embodiment, a third resistor 141 is connected between reference terminal 140 and first storage device terminal 128.

A first terminal 142 of third resistor 141 is connected to reference terminal 140. A second terminal 143 of third resistor 141 is connected to first energy storage device terminal 128. A comparison signal is supplied at the output of error amplifier 112 by control circuit 100 to switching regulator 106.

Switching regulator 106 includes a switching controller 146 having a switching controller input terminal 148 that is connected to error amplifier output terminal 144, and a switching controller output terminal 150 that is connected to output switches 152. In one embodiment, switching controller 146 is a pulse width modulator. In another embodiment, switching controller 146 is a pulse frequency modulator. Further, in one embodiment, output switches 152 include a main switch and a synchronous rectifier. In one embodiment, the main switch and the synchronous rectifier are N-type MOSFET devices. Output switches 152 also have a common output terminal that is a switched node 154. Additionally, output switches 152 include a first output switch terminal 156 that is connected to an input voltage $V_{IN}$, and a second output switch terminal 158 that is connected to ground. In one embodiment, switching regulator 106 includes an output filter 160 including at least one inductor and at least one capacitor. The output terminal of the output filter 160 is the output terminal 104 of switching regulator 106. Control circuit 100 may be separate from switching regulator 106, or it may be partially or fully integrated with switching regulator 106.

Pre-charge voltage $V_{Pre-Charge}$ may be supplied from an external voltage source that is present when diode 161 is forward biased, e.g., switching regulator 106 is off. Additionally, $V_{Pre-Charge}$ may result from a voltage supplied by stored energy in output filter 160.

The configuration of control circuit 100 results in the generation of a target voltage and a feedback input voltage. The voltage that is present at the first error amplifier input terminal 132 is the target voltage corresponding to the desired regulator output voltage. The target voltage may equal the desired regulator output voltage that appears at regulator output terminal 104. However, it is not necessary for the target voltage to equal the desired regulator output voltage provided that the target voltage corresponds to the desired regulator output voltage in some manner, for example, where the target voltage is a known percentage of the desired regulator output voltage. The voltage that appears at the second error amplifier input terminal 110 is the feedback input voltage corresponding to the voltage present at regulator output terminal 104. In operation, the error amplifier compares the target voltage to the feedback input voltage to generate the comparison signal. The value of the comparison signal is greatest when the difference between the target voltage and the feedback voltage is greatest. For example, either an increase in the value of the target voltage or a decrease in the value of the feedback voltage can result in an increase in the value of the comparison signal. The switching regulator responds to a positive comparison signal by increasing the regulator output voltage. The regulator output voltage is increased by increasing the amount of time that switched node 30 is connected to input voltage $V_{IN}$. Operation of output switches 152 is the result of logic signals appearing at switching controller output terminal 150.

As referred to herein, a regulator is off when none of the output switches 152 are on. It will be clear to one of ordinary skill in the art that a switching regulator that is off may still employ active logic and power circuits provided that none of the output switches 152 are on. Because the output switches are not operating when the regulator is off, switching regulator 106 does not produce an output voltage when it is off.

When switching regulator 106 is off, the circuit is in a first state. In the first state, isolation switch 134 is closed, thereby connecting first storage device terminal 128 to feedback input node 108. As a result, energy storage device 126 stores a voltage that is substantially equal to the voltage that appears at feedback input node 108. This stored voltage is a first value of the target voltage. The first value is present at first error amplifier input terminal 132 when switching regulator 100 is off. Where a pre-charge voltage exists at regulator output terminal 104, a corresponding voltage will appear at feedback terminal 102, feedback input node 108, and second error amplifier input terminal 110. As a result, with switching regulator 106 off, a voltage corresponding to the voltage at the regulator output terminal 104 is present at both the first error amplifier input terminal 132 and second error amplifier input terminal 110.

A start signal occurs substantially coincident with switching regulator 106 being turned on. In one embodiment, the start signal is a signal generated by the internal components of an integrated circuit, e.g., a signal indicating that there are no faults in the switching regulator. When a start signal is generated, isolation switch 134 opens. Because at startup the first value of the target voltage is substantially equal to the feedback voltage, the comparison signal will indicate that the regulator output voltage and the reference input voltage are equal. However, once isolation switch 134 opens, energy storage device 126 begins gradually to charge to a value corresponding to $V_{REF}$ which in-turn corresponds to the nominal regulator output voltage. If the pre-charge voltage is less than the nominal regulator output voltage, the target voltage supplied at first error amplifier input terminal 132 will increase above the feedback voltage that appears at second error amplifier input terminal 110. The rate at which the target voltage increases depends upon the time-constant of energy storage device 126. Thus, the comparison signal appearing at error amplifier output terminal 144 indicates to switching regulator 106 that switching regulator 106 output voltage should be increased. Switching regulator 106 operates to cause the voltage appearing at regulator output terminal 104 to increase until energy storage device 126 is fully charged to $V_{REF}$. At this time, the target voltage has reached a second value corresponding to a nominal regulator output voltage.

This embodiment of the invention is advantageous because when the switching regulator is first turned on the output voltage of the switching regulator is increased from the pre-charge voltage. As a result, switched node 154 is not connected to ground for an extended period that would permit the pre-charge voltage from being drained. Further, the use of energy storage device 126 provides a gradual increase, also referred to as a soft start, during which the switching regulator 106 output is gradually increased from the pre-charge voltage to the nominal regulator output voltage.

Figure 3:
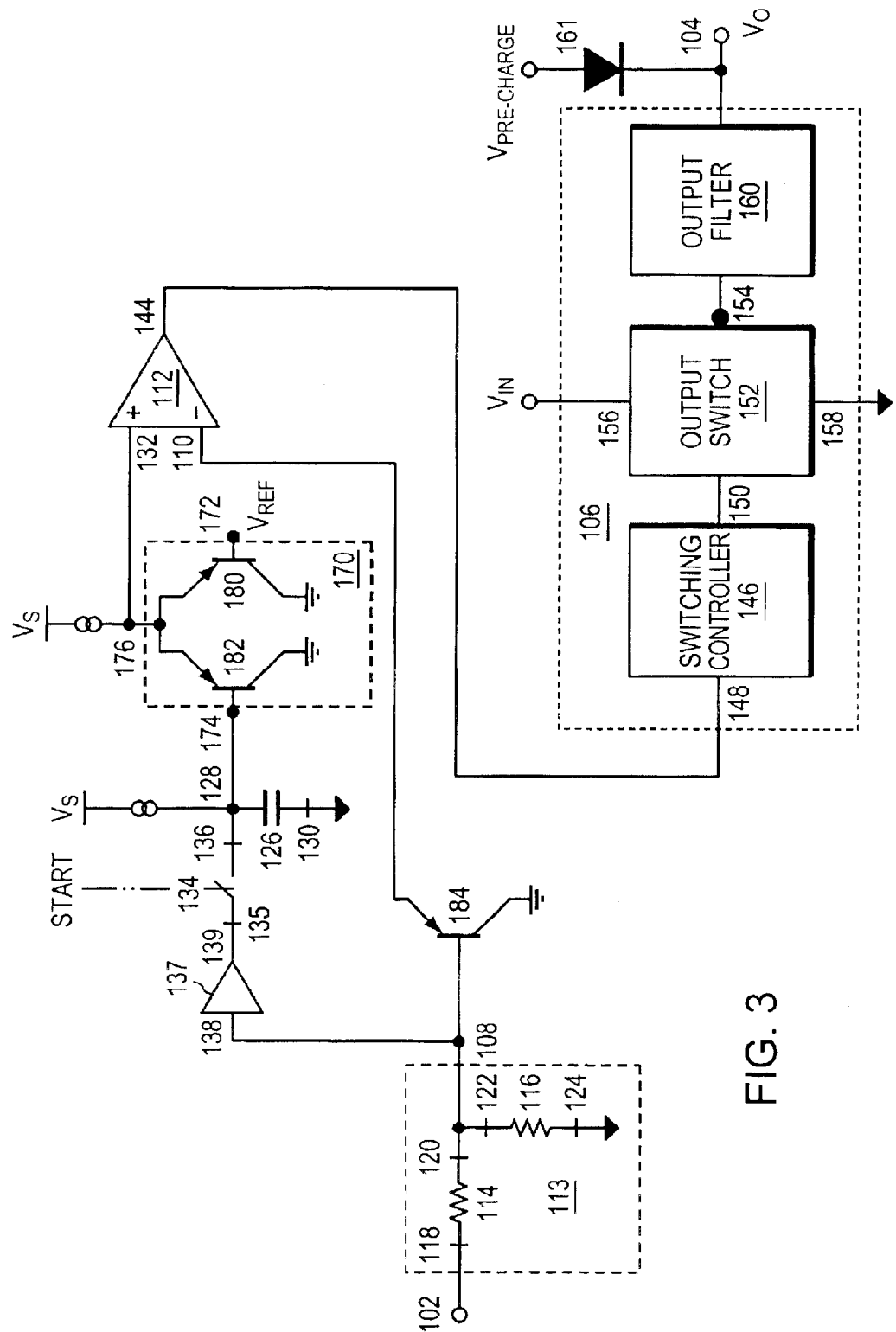
FIG. 3 is a schematic diagram of another embodiment of a circuit in accordance with the invention.

Referring now to FIG. 3, another embodiment of control circuit 100 is shown. The control circuit 100 input is connected to the regulator output terminal 104 at feedback terminal 102 through a means not shown here. Control circuit 100 includes a selector circuit 170 and error amplifier 112. Selector circuit 170 receives a first reference voltage at a second selector input terminal 174, and a second reference voltage at a first selector input terminal 172. The selector control terminal 176 is connected to first error amplifier input terminal 132. The error amplifier output terminal 144 is also the output of control circuit 100. Error amplifier output terminal 144 is connected to the input of switching regulator 106. A selector output signal produced at the selector control terminal 176 is employed by the error amplifier to generate a comparison signal appearing at error amplifier output terminal 144. The comparison signal is employed by the switching regulator 106 to control the regulator output voltage. In one embodiment, switching regulator 106 includes switching controller 146, output switches 152, and output filter 160.

In this embodiment, the selector output signal provided by selector circuit 170 is one of the first reference voltage and the second reference voltage. The selector output signal is the target voltage. The comparison signal results from a comparison, by the error amplifier, of the target voltage and the feedback voltage. Switching controller 146 generates a logic signal at the switching controller output terminal 150 in response to the comparison signal. The logic signal drives output switches 152. Depending upon the logic state of the logic signal, a switched node 154 is connected to either an input voltage $V_{IN}$ or ground. Thus the operation of the output switches adjusts the regulator output voltage that appears at regulator output terminal 104.

In more detail, the embodiment shown in FIG. 3 includes a selector circuit 170 with a first selector switch 180 and a second selector switch 182. In one embodiment, first selector switch 180 and second selector switch 182 are transistors. Selector circuit 170 includes a first selector input terminal 172, second selector input terminal 174, and a selector control terminal 176 that is connected to first error amplifier input terminal 132. Second error amplifier input terminal 110 is connected to feedback input node 108. As originally described with reference to FIG. 2, the control circuit 100 of FIG. 3 may include a resistance network 113 located between feedback terminal 102 and feedback input node 108. Second terminal 136 of isolation switch 134 is connected to first storage device terminal 128 of energy storage device 126. However, in the control circuit 100 of FIG. 3, first energy storage device terminal 128 is connected to second selector circuit input 174. In one embodiment, first selector switch 180 is a transistor with an emitter connected to selector control terminal 176, a base connected to first selector input terminal 172, and a collector connected to ground. Second selector switch 182 is a transistor with an emitter connected to the selector control terminal 176, a base connected to second selector input terminal 174, and a collector connected to ground. In another embodiment, a third transistor 184 is connected in control circuit 100 between feedback input node 108 and second error amplifier input terminal 110. Third transistor 184 is employed to eliminate any difference between the voltage appearing at first error amplifier input terminal 132 and the voltage appearing at second error amplifier input terminal 110 that is attributable to voltage drop across the base emitter junction of switches 180, 182. In yet another embodiment, transistors 180, 182, and 184 are type pnp transistors. Error amplifier output terminal 144 is connected to a switching controller input terminal 148. A supply voltage $V_S$ is connected to first energy storage device terminal 128 and selector circuit control terminal 176. A reference voltage $V_{REF}$ is connected to first selector circuit input terminal 172. In one embodiment, $V_{REF}$ corresponds to the nominal output voltage of switching regulator 106.

Switching regulator 106 includes a switching controller 146 having a switching controller input 148, and a switching controller output terminal 150. The switching controller output terminal 104 is connected to regulator output switch 152. Switched node 154 is connected to regulator output terminal 104. First output switch terminal 156 is connected to input voltage $V_{IN}$, and second output switch terminal 158 connected to ground. Switching regulator 106 may also include output filter 160 connected between output switch 152 and output terminal 104 and including at least one inductor and at least one capacitor.

When switching regulator 106 is off, isolation switch 134 of FIG. 3 is closed. As a result, a first reference voltage is present at second selector input terminal 174. With switching regulator 106 off, the first reference voltage has a first value that corresponds to the pre-charge voltage present at regulator output terminal 104. Selector circuit 170 compares the first value to a second reference voltage supplied at second selector input terminal 172. In one embodiment, the second reference voltage corresponds to a nominal regulator output voltage. As a result of the comparison, the selector output signal is present at selector control terminal 176. The selector output signal is a target voltage corresponding to the nominal regulator output voltage. In one embodiment, the selector output signal appearing at selector control terminal 176 corresponds to the lesser of the first reference voltage and the second reference voltage. In another embodiment, the selector output signal is one of the first reference voltage and the second reference voltage. Error amplifier 112 compares the selector output signal with the feedback voltage supplied at second error amplifier input terminal 110. As a result, the comparison signal is present at error amplifier output terminal 144. In one embodiment, the comparison signal is a difference between the selector output signal and the feedback voltage.

If the pre-charge voltage is less than the nominal regulator output voltage at start-up, the selector output signal corresponds to the pre-charge voltage. However, once the start signal occurs, isolation switch 134 opens and switching regulator 106 turns on. The voltage at second selector input terminal 174 gradually increases to the supply voltage $V_S$. The first reference voltage eventually increases to a value that is greater than $V_{REF}$ as energy storage device 128 is charged to supply voltage $V_S$, e.g., a second value of the first reference voltage is present at second selector input terminal 174. When the first reference voltage becomes greater than the second reference voltage, the selector output signal (i.e., target voltage) transitions from a value corresponding to the first reference voltage to a value corresponding to the second reference voltage. Thus, control circuit 100 of FIG. 3 provides a regulator output that increases from the pre-charge voltage when switching regulator 106 is turned on. This is, in part, the result of pre-setting a first reference voltage to a value corresponding to the pre-charge voltage present at the regulator output terminal 104.

Figure 4:
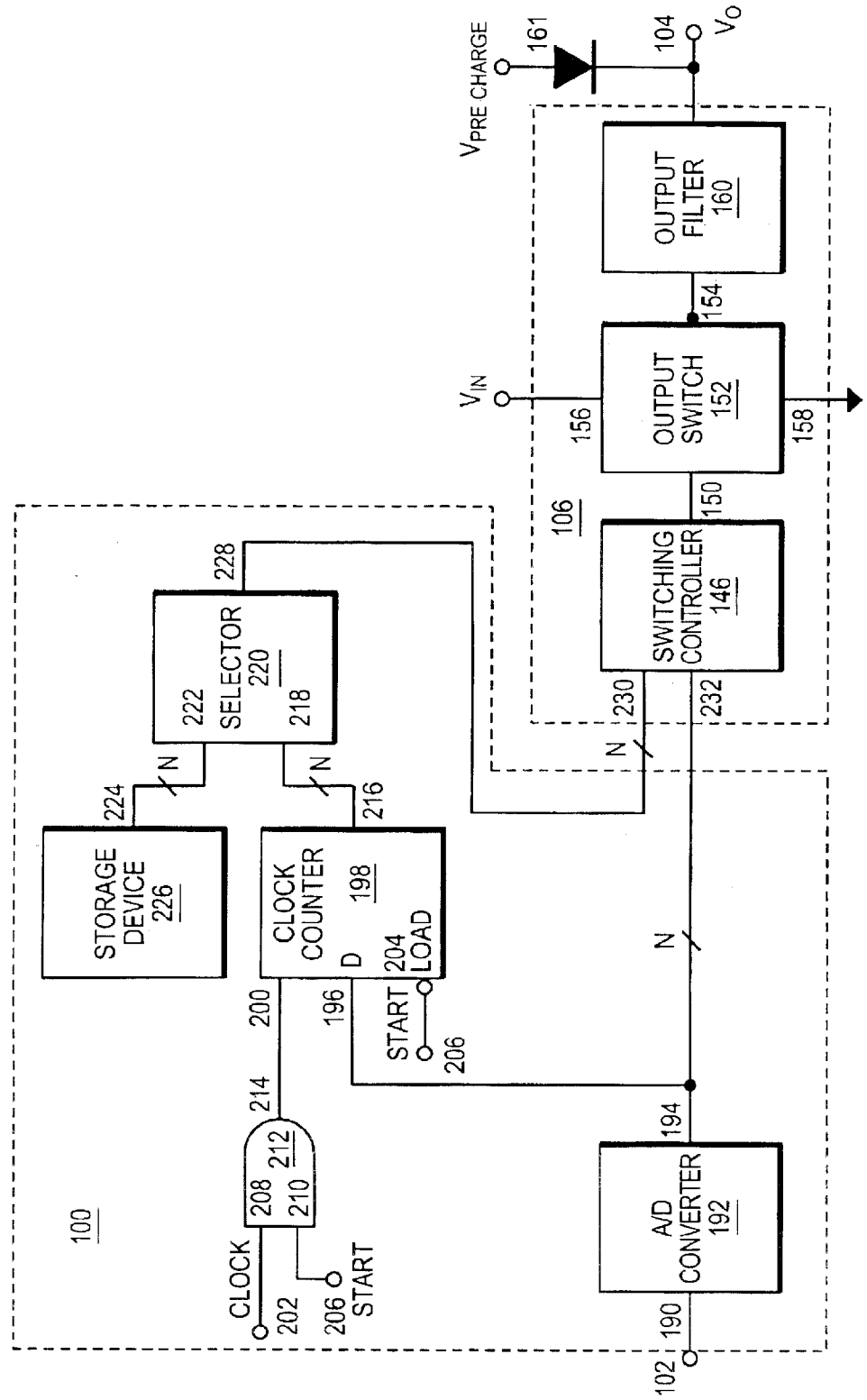
FIG. 4 is a schematic diagram of a further embodiment of a circuit in accordance with the invention.

Referring now to FIG. 4, another embodiment of control circuit 100 is shown. The control circuit 100 input is connected to the regulator output terminal 104 at feedback terminal 102 through a means not shown. Control circuit 100 includes an analog-to-digital converter ("A/D converter") 192, a counter 198, a storage device 226, and a selector 220. Counter 198 generates a first setpoint in response to a voltage present at regulator output terminal 104 and an elapsed time. Storage device 226 stores a second setpoint corresponding to a nominal regulator output voltage. Selector 220 generates a target value in response to a comparison between the first setpoint and the second setpoint. The target value is employed by switching regulator 106 to control the regulator output voltage. In one embodiment, switching regulator 106 includes switching controller 146 with a first controller input terminal 230 and a second controller input terminal 232, output switches 152, and output filter 160.

In this embodiment, first controller input terminal 230 receives the target value and second controller input terminal 232 receives a value corresponding to the voltage present at regulator output terminal 104. Switching controller 146 generates a logic signal at the switching controller output terminal 150 in response to the signals received at the first and second controller input terminals 230, 232. The logic signal drives output switches 152. Depending upon the logic state of the logic signal, a switched node 154 is connected to either an input voltage $V_{IN}$ or ground. Thus the operation of the output switches adjusts the regulator output voltage that appears at regulator output terminal 104.

Now in more detail, in FIG. 4, control circuit 100 includes feedback terminal 102 connected to regulator output terminal 104 and an input terminal 190 of an A/D converter 192. An A/D output terminal 194 is in electrical communication with a first (D) counter input terminal 196 of a counter 198. In one embodiment, clock terminal 202 is connected to a first AND gate input 208 and start terminal 206 is connected to a second AND gate input 210 of AND gate 212. In this embodiment, an AND gate output terminal 214 is connected to second counter input terminal 200. Counter 198 also has a counter output terminal 216 connected to a second selector input terminal 218 of selector 220. In one embodiment, selector 220 is a multiplexer. First selector input terminal 222 is connected to a storage device output terminal 224 of a storage device 226, and a selector output terminal 228 is connected to a first controller input terminal 230 of switching controller 146. A second controller input terminal 232 is connected to A/D output terminal 194. The first output switch terminal 156 is connected to input voltage $V_{IN}$ and the second output switch terminal 158 is connected to ground. In one embodiment, an output filter having at least a first inductor and a first capacitor is connected between the output terminal 150 of switching controller 146 and the output terminal 104. In one version of this embodiment, the first terminal of an inductor is connected to switched node 154, and a second inductor terminal is connected to regulator output terminal 104.

In one embodiment, counter 198 stores a first setpoint, and storage device 226 stores a second setpoint. In a version of this embodiment, the first setpoint corresponds to the voltage present at regulator output terminal 104 when the switching regulator 106 is off. The second setpoint corresponds to the nominal output voltage of switching regulator 106. The start command is a high logic state. The third counter input 204 is an inverting input. Because third counter input terminal 204 inverts the value present at start terminal 206, until the start command occurs, the low logic state appearing at start terminal 206 results in high logic state being received by counter 198. As a result, the value present at the A/D output terminal 194 is loaded into counter 198 so long as the low logic state is present at start terminal 206. Additionally, because second AND gate input terminal 210 is receiving a low logic state, the signal at AND gate output terminal 214 remains low and clock pulses occurring at clock terminal 202 are not received by counter 198. Thus, prior to the start signal transition from the low logic state to the high logic state, the first setpoint stored in counter 198 corresponds to the voltage present at regulator output terminal 104. The start signal transitions from the low logic state to the high logic state at substantially the same time the switching regulator turns on. When the state-change occurs, counter 198 stops updating the first setpoint with the value present at A/D output 194 because the signal that appears at third counter input 204 is a logic low state. Additionally, clock pulses that appear at clock terminal 202 also appear at second counter input terminal 200. Clock pulses received by counter 198 provide feedback regarding the elapsed time since the start signal transitioned to a high logic state. Because of the close timing between the moment the switching regulator 106 turns on and the start command, the clock pulses also provide feedback regarding the elapsed time since regulator 106 was turned on.

When the regulator 106 is on, the setpoint stored in counter 198 is updated upon receipt of each clock pulse at second counter input 200. As a result, the first setpoint is continually updated, e.g., gradually increases. The first setpoint is supplied to second selector input terminal 218. The second setpoint is provided to first selector input terminal 222. Selector 220 compares the value provided at first selector input terminal 222 with the value provided at second selector input terminal 218. A target value that is the lesser of the two setpoints is provided at the selector output terminal 228. Thus, this target value corresponds to one of the first setpoint and the second setpoint. The target value at first controller 230 input is compared with the feedback voltage provided at second controller input 232 by switching controller 146. As a result, switching regulator 106 is operated in response to the target value. When switching regulator 106 is off, the logic signal that appears at start terminal 206 transitions from a high logic state to a low logic state. As a result, a new value corresponding to the voltage present at regulator output terminal 104 is loaded into counter 198. At the next start command (i.e., transition of the logic signal at the start terminal back to a high logic state), the counter will again begin to update the value stored in the counter in response to an elapsed time.

Figure 5:
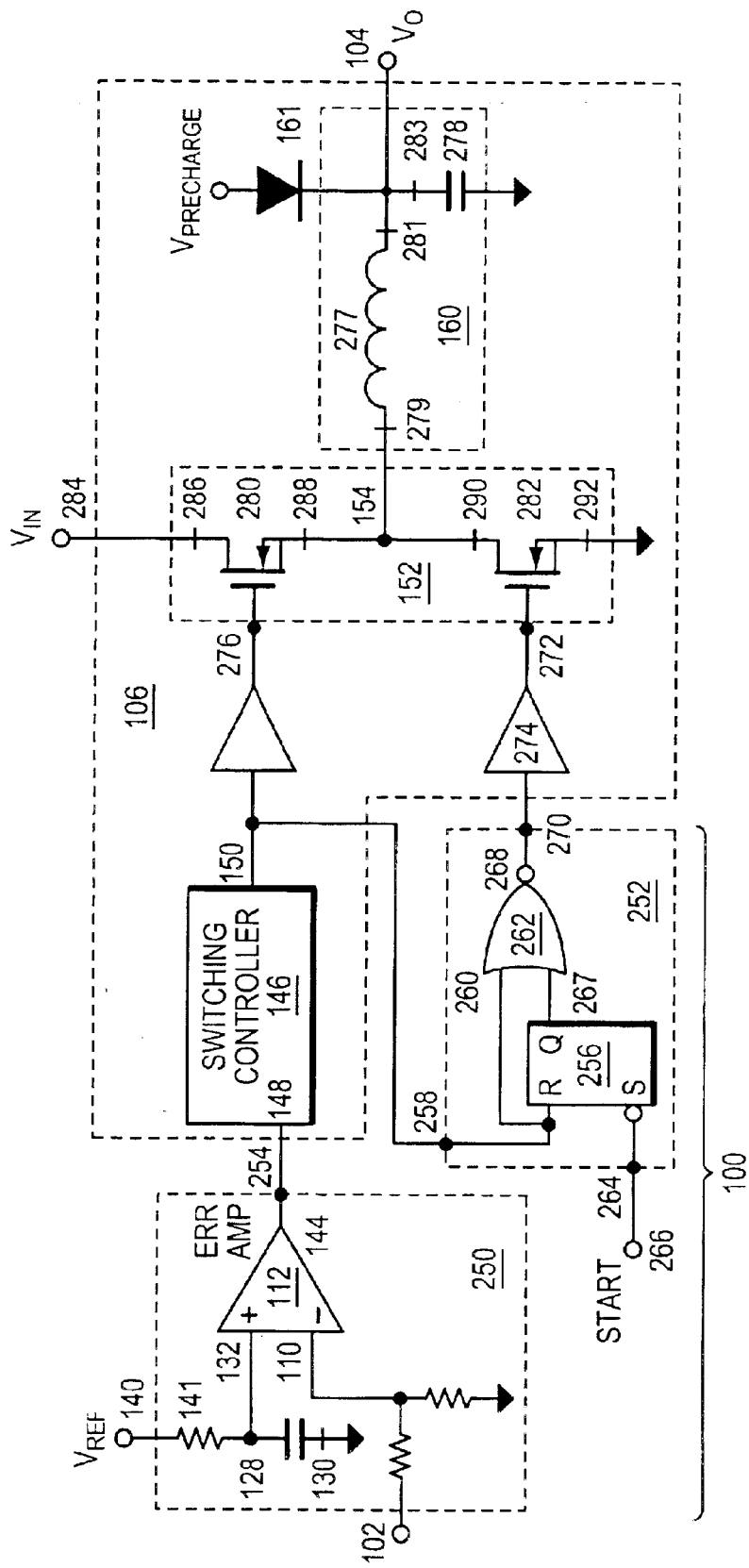
FIG. 5 is a schematic diagram of yet another embodiment of a circuit in accordance with the invention.

Referring now to FIG. 5, a further embodiment of control circuit 100 is shown. The control circuit 100 includes a comparison circuit 250 and a lockout circuit 252. Comparison circuit 250 includes error amplifier 112 with an error amplifier output terminal connected to a comparison circuit output terminal 254. Error amplifier 112 receives the target voltage at the first error amplifier input terminal 132 and the feedback voltage at the second amplifier input terminal 110. Error amplifier 112 generates a comparison signal at error amplifier output terminal 144. In one embodiment, switching regulator 106 includes switching controller 146 with switching controller input terminal 148, a first switch 280, a second switch 282 with a second switch control terminal 272, and output filter 160. Comparison circuit 250 is connected to the regulator output terminal 104 at feedback terminal 102 (through a means not shown here) and to the switching controller input terminal 148 at comparison circuit output terminal 254. Lockout circuit 252 is connected between the switching controller output terminal 150 and second switch control terminal 272.

In this embodiment, the comparison signal results from a comparison, by the error amplifier, of the target voltage and the feedback voltage. Switching controller 146 generates a logic signal at the switching controller output terminal 150 in response to the comparison signal. Generally, the logic signal drives first and second switches 280, 282. Depending upon the logic state of the logic signal, a switched node 154 is connected to either an input voltage $V_{IN}$ or ground. However, at startup, lockout circuit 252 is locked and second switch 282 is prevented from turning on. Lockout circuit 252 is unlocked when it receives an enable signal from the output of switching controller 146. Once lockout circuit 252 is unlocked, the second switch may be turned on. In one embodiment, the enable signal is a high logic state appearing at switching controller output terminal 150.

Now in more detail, in one embodiment of FIG. 5, feedback terminal 102 is directly connected to second error amplifier input terminal 110. In another embodiment, resistance circuit 113 is connected between feedback terminal 102 and second error amplifier input terminal 110 to shift the voltage at second error amplifier input terminal 110. In one embodiment, reference terminal 140 is connected to first error amplifier input 132, first energy storage device terminal 128 of energy storage device 126, and reference voltage $V_{REF}$. Second energy storage device terminal 130 is connected to ground. In the embodiment shown in FIG. 5, a resistance 141 is connected between first energy storage device terminal 128 and reference terminal 140. Error amplifier output terminal 144 is the comparison circuit output terminal 254. Comparison circuit output terminal 254 is connected to switching controller input terminal 148.

Lockout circuit 252 includes a flip-flop 256 (e.g., a set/reset flip-flop), and a first lockout circuit input terminal 258 is connected to each of an R input terminal of flip-flop 256, a first NOR gate input terminal of a NOR gate 262, and switching controller output 150. A second lockout circuit input terminal 264 is connected to a start terminal 266. An S input terminal of flip-flop 256 is connected to second lockout circuit input terminal 264. In the embodiment shown in FIG. 5, the signal received at second lockout input terminal 264 is inverted before being received at the S input terminal of flip-flop 256. A second NOR gate input terminal 267 is connected to a Q output terminal of flip-flop 256. A NOR gate output terminal 268 is connected to a lockout circuit output terminal 270 which is in turn connected to a second switch control terminal 272 through buffer amplifier 274.

Switching regulator 106 includes switching controller 146, switching regulator output terminal 104, output switches 152 including a first switch control terminal 276, second switch control terminal 272, and switched node 154. In one embodiment, the switching regulator output terminal 104 is connected to switched node 154 through output filter 160. Output filter 160 includes at least one inductor 277 and at least one capacitor 278. A pre-charge voltage is supplied from another power source to output terminal 104 through diode 161.

In one embodiment, output switches 152 include a first switch 280 and a second switch 282. In a version of this embodiment, first switch 280 is a main switch and second switch 282 is a synchronous rectifier. Additionally, in one embodiment each of the first and second switches 280, 282 is a N-type MOSFET devices. When first and second switches 280,282 are N-type MOSFETS, first switch 280 conducts when a high logic state is present at first switch control terminal 276, and second switch 282 conducts when a high logic state is present at second switch control terminal 272, i.e., a switch conducts when a high signal is present at the gate terminal of the switch. As shown in FIG. 5, input voltage terminal 284 connects voltage source $V_{IN}$ to first main switch terminal 286, e.g., to a drain terminal of the MOSFET. The second main switch terminal 288 (e.g., the MOSFET source terminal) is connected to switched node 154, and first synchronous rectifier terminal 290 (e.g., the MOSFET drain terminal of second switch). A second synchronous rectifier terminal 292 is connected to ground. First switch control terminal 276 is connected to switching controller output terminal 150.

In operation, in response to the comparison signal generated by error amplifier 112, switching controller 146 generates a logic signal to operate output switches 152. However, under certain conditions, lockout circuit 252 prevents second switch 282 from turning on when switching regulator 106 is turned on. In one embodiment, the logic signal appearing at start terminal 266 is a low logic state when switching regulator 106 is off. Because this logic state is inverted before being received at the S input terminal of flip-flop 256, this low logic state results in a high logic state appearing at the S input terminal. In response, flip-flop output Q is set to a logic high state. As a result, the NOR gate output 268 remains at a low logic state regardless of the input supplied to the first NOR gate input terminal 260. This low logic state prevents second switch 282 from turning on. Thus, in one embodiment, the start signal is the disable signal that places lockout circuit 266 in a locked state and prevents second switch 282 from turning on. When a start command (i.e., a high logic state at start terminal 266) is generated, flip-flop output Q does not change state because the high logic state appearing at start terminal 266 is inverted before being received at the S input terminal of flip-flop 256.

When switching regulator 106 begins operation, a voltage corresponding to reference voltage $V_{REF}$ is supplied to first energy storage device terminal 128. As a result, a gradually increasing target voltage appears at first error amplifier input terminal 132. Error amplifier 112 compares the target voltage with the feedback voltage present at second error amplifier input terminal 110, and generates a comparison signal corresponding to the difference between the target voltage and the feedback voltage. This comparison signal is supplied to switching controller input terminal 148. Switching controller 146 adjusts its output in response to the comparison signal. When the switching controller output is a logic high state, first switch 280 turns on and connects input voltage $V_{IN}$ to switched node 154. During normal operation a logic low state occurring at switching controller output terminal 150 causes second switch 282 to turn on and connect switched node 154 to ground.

Lockout circuit 252 remains in the locked state until the first appearance of a logic high state at switching controller output 150 after switching regulator 100 is turned on. The first logic high state appearing at switching controller output terminal 150 after switching regulator 106 is turned on resets flip-flop 256 and changes the logic state of flip-flop output Q to a logic low state. Further, in one embodiment, as a direct result of the enable signal, switching node 154 is connected to input voltage $V_{IN}$, and the regulator output voltage is increased. As a result, the voltage appearing at regulator output terminal 104 is increased. Once flip-flop output Q transitions to a low logic state, a logic low signal appearing at switching controller output terminal 150 will cause second switch 282 to turn on. Thus, in one embodiment, the switching controller output that turns on first switch 280 is the enable signal that unlocks lockout circuit 266 to allow second switch 282 to turn on. Switching regulator 106 will continue to operate in this manner (i.e., unlocked) unless another start pulse is received at the S input of the flip-flop 256.

Figure 6:
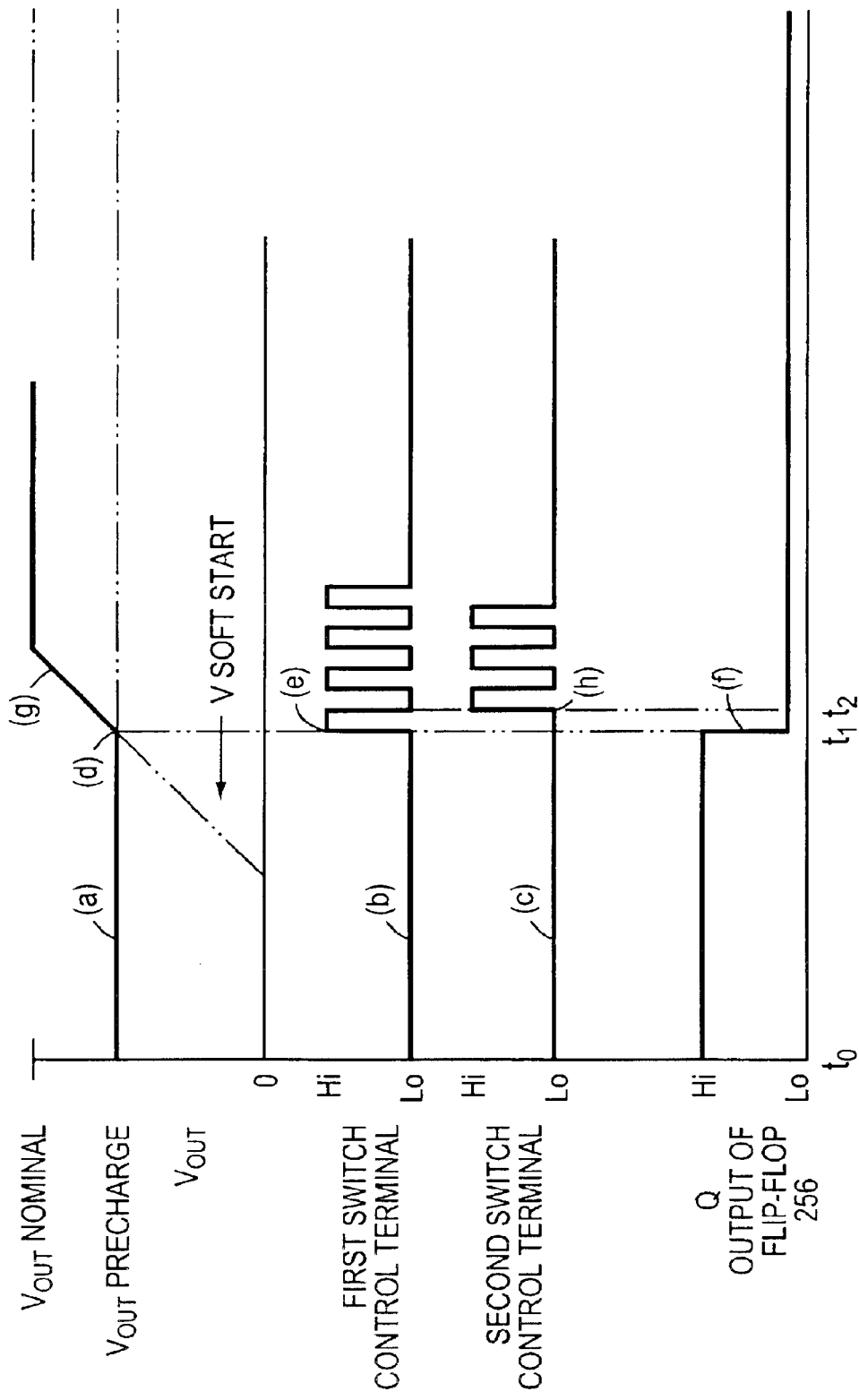
FIG. 6 is a timing diagram showing various signals of the circuit shown in FIG. 5.

Referring now to FIG. 6, a timing diagram for the embodiment of FIG. 5 is shown. In the timing diagram, the horizontal axis represents time and the vertical axis represents relative voltage for each of the signals. Q represents the signal at the flip-flop 256 output. First switch control terminal represents the logic signal appearing at first switch control terminal 276. Second switch represents the logic signal appearing at second switch control terminal 272. $V_{out}$ represents the voltage appearing at regulator output terminal 104. As can be seen in FIG. 6, Q is set to a high logic state at time $t_0$, for example, when the start signal is a low logic state that is received at second lockout input terminal 264. Further, Vout remains at the pre-charge voltage (a) as first energy storage device 126 is charged. At this time, a low logic state (b) is supplied by switching controller 146. Normally, this low logic state would produce a high logic state at second switch control terminal 282. However, as shown in FIG. 6, a low logic state (c) remains at second switch control terminal 272 because the lockout circuit is locked.

At time $t_1$, the voltage (d) present at first energy storage device terminal 128 has reached a value that is greater than the value corresponding to the pre-charge voltage, i.e., the feedback voltage that appears at second error amplifier input 110. The signal at switching controller output terminal 150 transitions from a low logic state to a high logic state (e). Also at time $t_1$, the switching controller output is received by lockout circuit 252. As a result, lockout circuit 252 is unlocked, flip-flop 256 is reset, and flip-flop output Q transitions from a logic high state to a low logic state (f). Additionally, the logic high signal appearing at switching controller output terminal 150 turns on first switch 280 connecting $V_{IN}$ to switched node 154. $V_{out}$ now begins to increase from the pre-charge voltage (g). Thereafter, provided that no additional start commands are received, the transition of the switching controller output from a logic high state to a logic low state results in a logic high state (h) at second switch control terminal 272 turning on second switch 282, for example, at time $t_2$. Thus, in this embodiment, the second switch 182 is prevented from turning on thereby shunting current at the switched node 154 to ground until the output of switching controller 146 transitions to a logic high state for the first time after the switching regulator is turned on.

While the invention has been shown and described with reference to specific embodiments, it should be understood by those of skill in the art that various changes in form and detail may be made therein without departing from the spirit and scope of the invention.

What is claimed is:

1. A circuit for controlling a switching regulator, the switching regulator comprising a switching controller and a regulator output terminal, the circuit comprising:
   an error amplifier comprising a first input terminal; a second input terminal; and an amplifier output terminal, said amplifier output terminal in electrical communication with said switching controller;
   a reference terminal in electrical communication with both the first input terminal of the error amplifier and a reference voltage;
   a feedback terminal in electrical communication with both the second input terminal of the error amplifier and the regulator output terminal; and
   an energy storage device comprising a first storage device terminal, the first storage device terminal in electrical communication with both the first input terminal of the error amplifier and the reference terminal,
   wherein the energy storage device provides a target voltage to the first input terminal of the error amplifier,
   wherein the target voltage has a first value corresponding to a voltage that is present at the regulator output terminal when the switching regulator is off, and
   wherein the target voltage has a second value corresponding to the reference voltage when the switching regulator is on.

2. The circuit as claimed in claim 1 wherein the first storage device terminal is in electrical communication with the feedback terminal when the switching regulator is off.

3. A method of controlling a switching regulator, the method comprising the steps of:

when the switching regulator is off;
setting a target voltage to a first value wherein the first value corresponds to a voltage at a regulator output terminal;
when the switching regulator is on;
adjusting the target voltage to a second value; and
controlling the switching regulator in response to the target voltage.

4. The method of claim 3 further comprising the steps of:
comparing the target voltage to a feedback voltage; and
generating a comparison signal as a result of the comparison.

5. The method of claim 3 further comprising the steps of generating the target voltage from a comparison between a first reference voltage and a second reference voltage.

6. The method of claim 5 wherein the target voltage is one of the first reference voltage and the second reference voltage.

7. The method of claim 3 further comprising the step of generating the first value in response to an energy storage device being placed in electrical communication with the regulator output terminal.

8. The method of claim 3 further comprising the step of generating the second value in response to an energy storage device being disconnected from the regulator output terminal.

9. A circuit for controlling a switching regulator, the switching regulator comprising a switching controller and a regulator output terminal, the circuit comprising:
an error amplifier comprising a first amplifier input terminal, a second amplifier input terminal, and an amplifier output terminal, said amplifier output terminal in electrical communication with the switching controller;
a selector circuit comprising a first selector input terminal, a second selector input terminal, and a selector output terminal, the selector output terminal in electrical communication with the first amplifier input terminal;
a reference terminal in electrical communication with the first selector input terminal;
a feedback terminal in electrical communication with both the second amplifier input terminal and the regulator output terminal; and
an energy storage device comprising a first storage device terminal, the first storage device terminal in electrical communication with the second selector input terminal,
wherein the energy storage device maintains a first voltage corresponding to a voltage present at the regulator output terminal when the regulator is off, and
wherein the selector circuit provides a target voltage, corresponding to one of the first voltage and a reference voltage present at the reference terminal, to the first amplifier input terminal.

10. The circuit of claim 9 wherein tile energy storage device is disconnected from the feedback terminal when the switching regulator is turned on.

11. A circuit for controlling a switching regulator the switching regulator comprising a regulator output terminal, a switching controller, the switching controller comprising a first controller input terminal and a second controller input terminal, the circuit comprising:
an analog-to-digital converter comprising an input terminal and an output terminal, the output terminal in electrical communication with the second controller input terminal;
a feedback terminal in electrical communication with both the input terminal of the analog-to-digital converter and the regulator output terminal;
a counter comprising a first counter input terminal in electrical communication with the output terminal of the analog-to-digital converter, and a counter output terminal;
a storage device comprising a storage device output terminal, wherein the storage device stores a second setpoint that corresponds to a nominal regulator output voltage; and
a selector comprising a first selector input terminal in electrical communication with the storage device output terminal, a second selector input terminal in electrical communication with the counter output terminal, and a selector output terminal is in electrical communication with the first controller input terminal,
wherein the counter generates a first setpoint in response to both a voltage present at the regulator output terminal and an elapsed time, and
wherein the selector provides a target value in response to the first setpoint and the second setpoint.

12. The circuit as claimed in claim 11 wherein a clock terminal is in electrical communication with a second counter input terminal, and
wherein the counter adjusts the first setpoint in response to a clock signal present at the clock terminal.

13. The circuit as claimed in claim 11 wherein a start terminal is in electrical communication with a third counter input terminal, and
wherein the counter generates the first setpoint in response to a start signal present at the start terminal.

14. A method of controlling a switching regulator, the method comprising the steps of:
when the switching regulator is off;
establishing a first setpoint value corresponding to a voltage at a regulator output terminal;
when the switching regulator is on;
adjusting the first setpoint value in response to an elapsed time; and
controlling the switching regulator in response to the first setpoint value.

15. The method of claim 14, further comprising the steps of:
setting a second setpoint value corresponding to a regulator output voltage; and
selecting a target value that corresponds to one of the first setpoint value and the second setpoint value.

16. The method of claim 14, further comprising the step of establishing the first setpoint value in response to a start signal.

17. The method of claim 16, further comprising the step of adjusting the elapsed time in response to the start signal and a clock signal.

18. A circuit for controlling a switching regulator, the switching regulator comprising output switches comprising a first switch and a second switch, a switched node, a regulator output terminal, and a switching controller, the switching controller comprising a controller output terminal, the controller output terminal in electrical communication with the first switch, the circuit comprising:
a lockout circuit comprising a first lockout circuit input terminal in electrical communication with the controller output terminal, and a lockout circuit output terminal, the lockout circuit output terminal in electrical communication with the second switch, wherein the lockout circuit prevents the second switch from connecting the switched node to ground until the switching controller generates an enable signal at the controller output terminal, and wherein the switching regulator increases a regulator output voltage in response to the enable signal.

19. The circuit as claimed in claim 18 wherein the second switch is a synchronous rectifier.

20. The circuit as claimed in claim 19 wherein the switching controller is a pulse width modulator.

21. The circuit as claimed in claim 18, further comprising:

a controller input terminal;

an error amplifier comprising a first amplifier input terminal, a second amplifier input terminal, and an amplifier output terminal, the amplifier output terminal in electrical communication with the controller input terminal;

an energy storage device comprising an energy storage device terminal, the energy storage device terminal in electrical communication with the first amplifier input terminal; and a feedback terminal in electrical communication with both the second amplifier input terminal and the regulator output terminal, wherein a feedback voltage corresponding to a voltage at the regulator output terminal is present at the second amplifier input terminal, and wherein the enable signal is initiated when a first input voltage present at the first amplifier input terminal is greater than the feedback voltage.

22. The circuit as claimed in claim 21 further comprising a second lockout circuit input terminal wherein the lockout circuit prevents the second switch from connecting the switched node to ground when a disable signal is received at the second lockout input terminal.

23. A method of controlling a switching regulator comprising a synchronous rectifier, a switched node and a switching controller, the switching controller comprising a controller output terminal, the method comprising the steps of:

disabling the synchronous rectifier in response to a disable signal, to prevent the synchronous rectifier from turning on; and enabling the synchronous rectifier in response to an enable signal that is generated by the switching controller at the controller output terminal, to allow the synchronous rectifier to turn on.

24. The method of claim 23, further comprising the step of increasing a target voltage after the enable signal is generated.

25. The method of claim 24, further comprising the step of supplying the target voltage to an error amplifier input terminal.

26. The method of claim 23 wherein the switching controller is a pulse width modulator.

27. The method of claim 23 wherein the switching controller is a pulse frequency modulator.

28. The method of claim 23, further comprising the step of connecting an input voltage to the switched node to in response to the enable signal.

* * * * *

UNITED STATES PATENT AND TRADEMARK OFFICE
CERTIFICATE OF CORRECTION

PATENT NO. : 6,922,041 B2
DATED : July 26, 2005
INVENTOR(S) : Dimitry Goder et al.

It is certified that error appears in the above-identified patent and that said Letters Patent is hereby corrected as shown below:

Column 15,
Line 56, delete "wherein tile energy storage" and insert therefor -- wherein the energy storage --.

Signed and Sealed this

Eighth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,922,041 B2
APPLICATION NO. : 10/377182
DATED : July 26, 2005
INVENTOR(S) : Dimitry Goder et al.

It is certified that error appears in the above-identified patent and that said Letters Patent is hereby corrected as shown below:

On Title page
[*] Notice
Patentes request that the determination of patent term adjustment under 35 U.S.C. 154 (b) Delete the phrase by 92 days and insert by 188 days.

Signed and Sealed this

Second Day of October, 2007

JON W. DUDAS
*Director of the United States Patent and Trademark Office*